United States Patent
Schuster et al.

(10) Patent No.: US 6,731,630 B1
(45) Date of Patent: May 4, 2004

(54) FLEXIBLE DIAL PLAN FOR A DATA NETWORK TELEPHONY SYSTEM

(75) Inventors: Guido M. Schuster, Des Plaines, IL (US); Ikhlaq S. Sidhu, Vernon Hills, IL (US); Frederick D. Dean, Chicago, IL (US); Jerry J. Mahler, Prospect Heights, IL (US); Jacek A. Grabiec, Chicago, IL (US); Andrew Bezaitis, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/515,797

(22) Filed: Feb. 29, 2000

(51) Int. Cl.$^7$ ................................................ H04L 15/56
(52) U.S. Cl. ........................................ 370/356; 379/900
(58) Field of Search ................................ 371/352, 353, 371/356, 465; 379/88.17, 900

(56) References Cited

U.S. PATENT DOCUMENTS

| 4,313,035 A | 1/1982 | Jordan et al. |
| 4,953,198 A | 8/1990 | Daly et al. ........................ 379/61 |
| 5,428,663 A | 6/1995 | Grimes et al. |

(List continued on next page.)

FOREIGN PATENT DOCUMENTS

| DE | 198 13 179 A 1 | 9/1999 |
| EP | 0 578 374 A1 | 8/1993 |
| EP | 0 074 788 A2 | 4/1996 |

(List continued on next page.)

OTHER PUBLICATIONS

U.S. patent application Ser. No. 09/451,388, Schuster et al., filed Nov. 30, 1999.

(List continued on next page.)

*Primary Examiner*—Min Jung
(74) *Attorney, Agent, or Firm*—McDonnell Boehnen Hulbert & Berghoff LLP (57) ABSTRACT

A dial plan for a data network telephony system is provided. A variable-length-code scheme is used to assign communication numeral strings to user identifiers and/or device identifiers, such as SIP URIs (Universal Resource Identifier). The dial plan enables a user to enter a user identifier (or device identifier) into a conventional keypad of a data network telephone, such as an Internet telephony phone. Additionally, embodiments of the disclosed dial plan include techniques for dialing from one data network telephone to another data network telephone utilizing the same service provider, dialing from one data network telephone utilizing a first service provider to a second data network telephone utilizing a second service provider, and dialing from a data network telephone to a PSTN phone and vice versa. The flexible dial plan preferably includes formulating a communication number into a domain portion and a subscriber portion, where the domain portion and the subscriber portion each include a quantity indicator to specify a number of digits making up the remainder of the domain portion, the subscriber portion, or the entire communication portion. Upon accepting an entered communication number from a user, the data network telephone parses the entered communication number into the domain portion and the subscriber portion and accesses database to determine a user identifier or device identifier corresponding to the entered communication number. The data network telephone may then set up a call using the determined user identifier.

40 Claims, 6 Drawing Sheets

U.S. PATENT DOCUMENTS

| | | | |
|---|---|---|---|
| 5,448,623 A | 9/1995 | Wiedeman et al. | |
| 5,497,339 A | 3/1996 | Bernard | 364/705.05 |
| 5,557,658 A | 9/1996 | Gregorek et al. | 379/67 |
| 5,563,937 A | 10/1996 | Bruno et al. | |
| 5,606,594 A | 2/1997 | Register et al. | 379/58 |
| 5,646,945 A | 7/1997 | Bergler | |
| 5,727,057 A | 3/1998 | Emery et al. | 379/211 |
| 5,732,074 A | 3/1998 | Spaur et al. | |
| 5,732,216 A | 3/1998 | Logan et al. | |
| 5,742,905 A | 4/1998 | Pepe et al. | 455/461 |
| 5,838,665 A | 11/1998 | Kahn et al. | 370/260 |
| 5,850,433 A | 12/1998 | Rondeau | 379/201 |
| 5,875,405 A | 2/1999 | Honda | |
| 5,894,473 A | 4/1999 | Dent | |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | |
| 5,933,778 A | 8/1999 | Buhrmann et al. | 455/461 |
| 5,938,757 A | 8/1999 | Bertsch | |
| 5,960,340 A | 9/1999 | Fuentes | |
| 5,991,394 A | 11/1999 | Dezonno et al. | |
| 6,006,272 A | 12/1999 | Aravamudan et al. | |
| 6,014,379 A * | 1/2000 | White et al. | 370/389 |
| 6,031,904 A | 2/2000 | An et al. | |
| 6,075,992 A | 6/2000 | Moon et al. | |
| 6,161,134 A | 12/2000 | Wang et al. | |
| 6,163,598 A | 12/2000 | Moore | |
| 6,175,860 B1 | 1/2001 | Gaucher | |
| 6,216,158 B1 | 4/2001 | Luo et al. | |
| 6,240,097 B1 | 5/2001 | Wesolek et al. | |
| 6,275,574 B1 * | 8/2001 | Oran | 379/201.01 |
| 6,301,609 B1 | 10/2001 | Aravamudan et al. | |
| 6,308,201 B1 | 10/2001 | Pivowar et al. | |
| 6,396,830 B2 * | 5/2002 | Aravamudan et al. | 370/356 |
| 6,411,965 B2 | 6/2002 | Klug | |
| 6,463,051 B1 * | 10/2002 | Ford | 370/352 |
| 6,466,570 B1 * | 10/2002 | Low et al. | 370/352 |
| 6,529,894 B1 * | 3/2003 | Haeri et al. | 707/1 |
| 6,539,077 B1 * | 3/2003 | Ranalli et al. | 379/67.1 |

FOREIGN PATENT DOCUMENTS

| | | |
|---|---|---|
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

U.S. patent application Ser. No. 09/406,231, Schuster et al., filed Sep. 27, 1999.

U.S. patent application Ser. No. 09/515,365, Schuster et al., filed Feb. 29, 2000.

U.S. patent application Ser. No. 09/406,320, Schuster et al., filed Sep. 27, 1999.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed, May 31, 2000

U.S. patent application Ser. No. 09/515,969, Schuster et al., filed Feb. 29, 2000.

U.S. patent application Ser. No. 09/406,322 Schuster et al., filed Sep. 27, 1999.

U.S. patent application Ser. No. 09/406,152, Schuster et al., filed Sep. 27, 1999.

U.S. patent application Ser. No. 09/405,981, Schuster et al., filed Sep. 27, 1999.

U.S. patent applciation Ser. No. 09/406,128, Schuster et al., filed Sep. 27, 1999.

U.S. patent applciation Ser. No. 09/515,387, Schuster et al., filed Feb. 29, 2000.

U.S. patent application Ser. No. 09/515,970, Schuster et al., filed Feb. 29, 2000.

U.S. patent applciation Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.

U.S. patent application Ser. No. 09/406,066, Schuster et al., filed Sep. 27, 1999.

U.S. patent application Ser. No. 09/515,795, Schuster et al., filed Feb. 29, 2000.

U.S. patent applciation Ser. No. 09/516,269, Schuster et al., field Feb. 29, 2000.

U.S. patent application Ser. No. 09/515,366, Schuster et al., filed Feb. 29, 2000.

U.S. patent application Ser. No. 09/470,879, Schuster et al., filed Dec. 22, 1999.

U.S. patent application Ser. No. 09/707,708, Schuster et al., filed Nov. 7, 2000.

U.S. patent application Ser. No. 09/677,077, Schuster et al., filed Sep. 29, 2000.

U.S. patent application Ser. No. 09/584,927, Schuster et al., filed May 31, 2000.

U.S. patent application Ser. No. 09/726,993, Schuster et al., filed Nov. 30, 2000.

U.S. patent application Ser. No. 09/728,833, Schuster et al., filed Nov. 30, 2000.

Terry, Douglas B. et al. *Managing Stored Voice In the Etherphone System*, Opertaing Systems Review (SIGOPS), US, ACM Head Quarter, New York, NY. vol. 21, No. % (Nov. 8, 1987), pp. 103–104, XP 000005196.

Zellweger, Polle T. et al. *An Overview of the Etherphone System and Its Applications*, Xerox Palo Alto Research Center (Mar. 1988), pp. 160–168, XP 000617541.

Terry, Douglas B. et al. *Managing Stored Voice In the Etherphone System*, Xerox Palo Alto Research Center vol. 1, (Feb. 1988), pp. 3–27, XP 000032477.

Hansson, Allan et al., *Phone Doubler—A Step Towards Integrated Internet and Telephone Communities*, Ericsson Review, No. 4, 1997, pp. 142–152.

International Search Report for PCT Application Ser. No. PCT/US00/26618, Dated Feb. 19, 2001.

Pepper, David J. et al., *The Call Manager System: A Platform for Intelligent Telecommunciation Services*, Speech Communication, vol. 23, (1997), pp. 129–139.

Dalgic, Ismail et al., *True Number Portability and Advanced Call Screening in a SIP–Based IP Telephony System*, IEEE Communications Magazine, vol. 37, No. 7, (Jul. 1999), pp. 96–101.

International Search Report for PCT Application Ser. No. PCT/US00/26094, Dated Jan. 31, 2001.

International Search Report for PCT Application Ser. No. PCT/US00/26594, Dated Feb. 6, 2001.

Watanabe, H. et al., *Development of the BTRON–BrainPad*, Proceedings 13$^{th}$ Tron Project International Symposium, Online!, (Dec. 4–7, 1996), pp. 95–103.

Gessler, Stefan et al., *PDAs as Mobile WWW Browsers*, Computer Networks and ISDN Systems, vol. 28, No. 1, (Dec. 1995), pp. 53–59.

Interantional Search Report for PCT Application Ser. No. PCT/US00/26650, Dated Feb. 19, 2001.

International Search Report for PCT Application Ser. No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pp. 151–157.

Interantional Search Report for PCT Application Ser. No. PCT/US00/26649, Dated Feb. 6, 2001.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191⁻eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Hadley/Schulzrinne/Schooler/Rosenberg, SIP: Session Initiation Protocol, Network Working Group, Request for Comments (RFC) 2543, Mar. 1999. (153 pages).

\* cited by examiner

FLEXIBLE DIAL PLAN FOR A DATA NETWORK TELEPHONY SYSTEM

BACKGROUND OF THE INVENTION

A. Field of the Invention

The present invention is related to data network telephony systems. In particular, the present invention relates to assigning communication numbers to users and/or devices, within a data network telephony system.

B. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear-a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID. The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone or other device to which calls will be forwarded.

Much of the lack of flexibility of the PSTN features is due to the inflexible nature of the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound, converting the sound from the handset to analog signals, generating the appropriate dial tones when a key on the keypad is pressed, and ringing when there is an incoming call.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. A PSTN telephone having a display function is effectively limited to displaying text, again, as a "dumb" terminal.

The Internet presents a possible solution for distributing intelligence to telephony terminal devices. In Internet telephony, digitized voice is treated as data and transmitted across a digital data network between a telephone call's participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is not much more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Data network telephones and the data network (e.g. Internet) system in which they operate, however, lack a substantial infrastructure and service providers for providing telephone service.

Conventional communication systems, such as the PSTN, have typically assigned telephone numbers to subscribers based on the geographic location of the subscriber. For any particular country or area, a convention is used, such as a three digit area code, a three digit local exchange code, and a four digit user code. Thus, the numbers for a particular geographic location are limited, based on the definitions set forth in the convention adopted by the country or area. With the advent of facsimile machines, dial-up connections, cellular phones, and pagers, these geographically assigned numbers are frequently in short supply, and many geographic locations have been required to add new area codes, often forcing existing subscribers to change telephone numbers. This can be both costly and inconvenient for the subscribers.

It would be desirable to incorporate CLASS and PBX features into a data network telephony system, in which communication numbers are assigned, that uses a data network such as the Internet.

It would be desirable to provide new features and enhancements to telephony service that accommodate and conform to users' needs.

It would also be desirable to provide features and capabilities to telephone service that create new opportunities for users and for service providers.

A flexible dial plan for a data network telephony system would also be desirable.

A desirable dial plan for a data network telephony system would allow variable length communication numbers (e.g. telephone numbers) to be assigned and used for dialing.

It would also be desirable for a dial plan to differentiate between PSTN calls and data network calls.

It would additionally be desirable for service providers to be assigned geographically non-distinct provider codes.

SUMMARY OF THE INVENTION

The present invention is directed toward a dial plan for a data network telephony system. Various embodiments of the present invention provide a system of unique communication numbers that can be expanded to include additional users or domains. By utilizing a variable-length-coding scheme, embodiments of the present invention enable a data network telephone to parse an entered communication number into a user/device identifier, such as a SIP URI (Universal Resource Indicator). In a preferred embodiment, the parsing is performed in real-time, as a user enters the number into a keypad on the data network telephone. Additional embodiments of the present-invention include techniques for placing calls between a variety of differently-situated data network telephones, preferably utilizing the variable-length-coding scheme for communication numbers.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

A. Related Applications

The following references to patent applications are incorporated by reference herein:

"System And Method For Providing Telephone Service Having Private Branch Exchange Features In A Data Network Telephony System" to Schuster et al., Ser. No. 09/515,365, filed concurrently herewith;

"System And Method For Providing A Wireless Data Network Telephone System" to Schuster et al., Ser. No. 09/515,798, filed concurrently herewith;

"System And Method For Accessing A Network Server Using A Portable Information Devices Through A Network Based Telecommunication System" to Schuster et al., Ser. No. 09/515,969, filed concurrently herewith;

"System And Method For Accessing Radio Programs Using A Data Network Telephone In A Network Based Telecommunication System" to Schuster et al., Ser. No. 09/516,269, filed concurrently herewith;

"System And Method For Providing Local Information In A Data Network Telephony System" to Schuster et al., Ser. No. 09/515,366, filed concurrently herewith;

"System And Method For Enabling A Portable Information Device For Use In A Data Network Telephone System" to Schuster et al., Ser. No. 09/515,795, filed concurrently herewith;

"Dialing Token For Initiating A Telephone Connection In A Data Network Telephone System" to Schuster et al., Ser. No. 09/515,364, filed concurrently herewith;

"Personalized Call Announcement on a Data Network Telephony System" to Schuster, et al., Ser. No. 09/515,387, filed concurrently herewith;

"Personalizing a Data Network Appliance on a Data Network Telephony System" to Schuster, et al., Ser. No. 09/515,970, filed concurrently herewith;

"Proximity-Based Registration on a Data Network Telephony System" to Schuster, et al., Ser. No. 09/515,796, filed concurrently herewith;

"System and Method for Providing User Mobility Services on a Telephony Network" to Schuster, et al., Ser. No. 09/451,388;

"System and Method for Providing Call-Handling Services on a Telephony Network" to Schuster, et al., Ser. No. 09/470,879;

"Method Apparatus and Communication System for Companion Information and Network Appliances" to Wang, et al., Ser. No. 09/181,431;

"System and Method for Controlling Telephone Service Using a Wireless Personal Information Device" to Schuster, et al., Ser. No. 09/406,321;

"System and Method for Advertising Using Data Network Telephone Connections" to Schuster, et al., Ser. No. 09/406,320;

"System and Method for Providing User-Configured Telephone Service in a Data Network Telephony System" to Sidhu, et al., Ser. No. 09/405,283;

"System and Method for Accessing a Network Server Using a Portable Information Device Through a Network Based Telecommunication System" to Schuster, et al., Ser. No. 09/406,322;

"System and Method for Interconnecting Portable Information Devices Through a Network Based Telecommunication System" to Schuster, et al., Ser. No. 09/406,152;

"System and Method for Enabling Encryption on a Telephony Network" to Schuster, et al., Ser. No. 09/405,981;

"System and Method for Associating Notes with a Portable Information Device on a Network Telephony Call" to Schuster, et al., Ser. No. 09/406,151;

"System and Method for Providing Shared Workspace Services Over a Telephony Network" to Schuster, et al., Ser. No. 09/406,298;

"System and Method for Providing Service Provider Configurations for Telephones in a Data Network Telephony System" to Schuster, et al., Ser. No. 09/406,066;

System and Method for Using a Portable Information Device to Establish a Conference Call on a Telephone Network" to Schuster, et al., Ser. No. 09/406,128;

"Multiple ISP Support for Data Over Cable Networks" to Ali Akgun, et al., Ser. No. 09/321,941;

"Method and System for Provisioning Network Addresses in a Data-Over-Cable System" to Ali Akgun, et al., Ser. No. 09/218,793; and "Network Access Methods, Including Direct Wireless to Internet Access" to Yingchun Xu, et al., Ser. No. 08/887,313.

B. Data Network Telephony System

Figure 1:
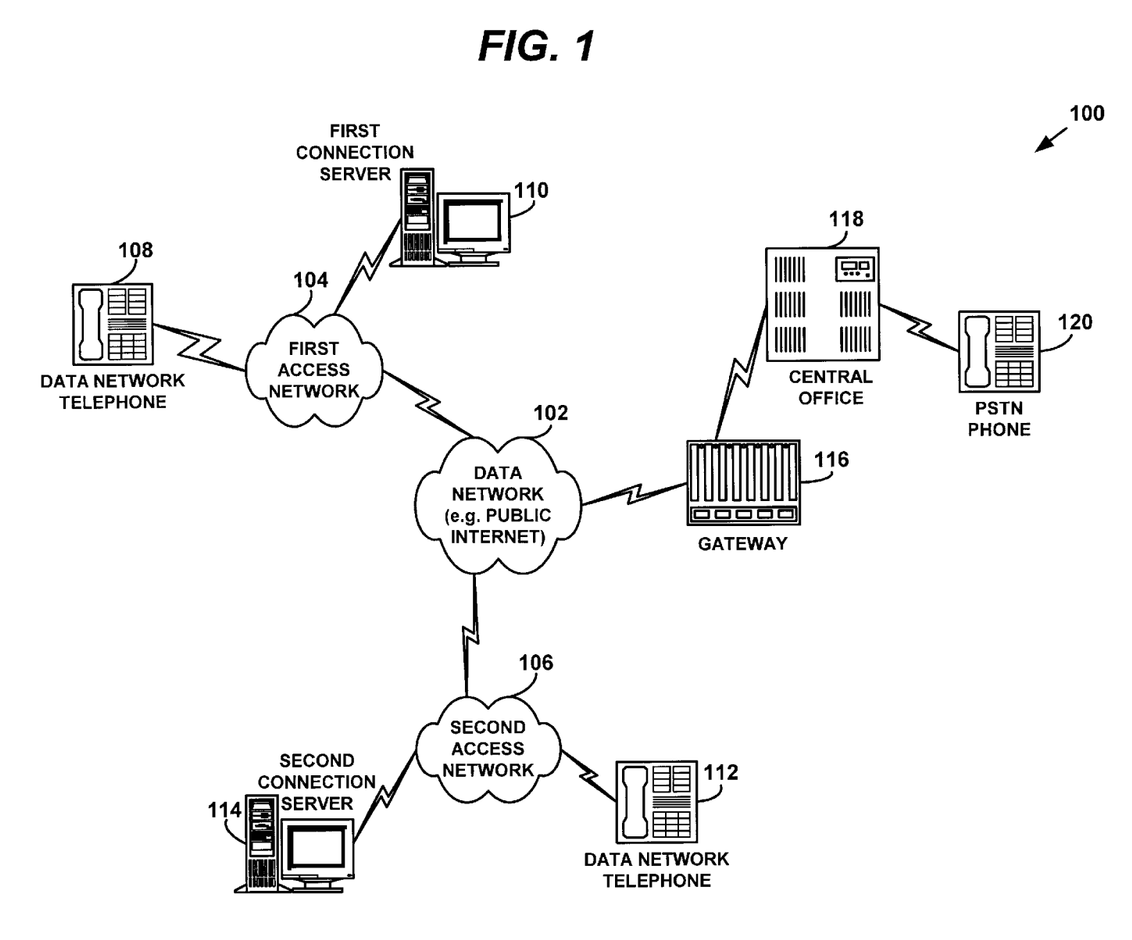
FIG. 1 is a block diagram of a data network telephony system, according to an exemplary embodiment of the present invention.

FIG. 1 is a block diagram showing a data network telephone system 100 according to an exemplary embodiment of the present invention. The system 100 includes a data network 102, which is preferably a public internet, such as the Internet. A first access network 104 and a second access network 106 are connected to the data network 102. A data network telephone 108 is linked to the first access network 104, and may communicated via the first access network 104 and the data network 102 to a second data network telephone 112 linked to the second access network 106. A first connection server 110 may be linked to the first access network 104, and a second connection server 114 may be linked to the second access network 106, to provide telephony registration, location, and session initiation services for voice and/or data connections. The system 100 also enables the data network telephones 108 and 112 to call and be called by PSTN users. A gateway 116 is thus connected to the data network 102. The gateway 116 is linked to a PSTN central office 118, which provides PSTN service to a PSTN phone 120. The PSTN phone 120 is likely to be one of many PSTN phones serviced by the central office 118. The PSTN system may include additional components, as will be understood by those having skill in the field of telecommunications.

The data network 102 in the system 100 typically includes one or more Local Area Networks (LANs) connected to one another or to a Wide Area Network (WAN), such as an Internet Protocol (IP) network, to provide wide-scale data connectivity. The data network 102 may use Voice-Over-Packet (VOP) schemes in which voice signals are carried in data packets. In one embodiment, the data network 102 may include one or more Ethernet LANs and may support data transport protocols for performing Voice Over Internet Protocol (VoIP) techniques on the Internet. For further details regarding VoIP, see the information available through the web site of the Internet Engineering Task Force (IETF) at www.ietf.org. Other data besides voice data, such as video data, may also be communicated over the data network 102. Similarly, the first access network 104 and the second access network 106 may also be comprised of one or more LANs, such as Ethernet LANs. One or more routers, switches, or other network elements may be used to provide data connectivity and to implement switching and routing functions, for example.

The data network telephones 108 and 112 are preferably used in combination with a plurality of other similar data network telephones located at other points on the first and second access networks 104 and 106 and/or at other points on the data network 102. Alternatively, other communication clients, such as a VoIP-enabled personal computer may also be used for communicating with the data network telephones 108 and 112 via the data network 102.

The data network telephones 108 and 112 preferably each include a voice input, a voice output, and a voice processing system, and are adapted for use with a data network. The voice processing system converts voice sound to digital data signals that are communicated on a voice connection over the data network. Digital data signals received from the voice connection are also converted to voice sound by the voice processing system. The data network telephones 108 and 112 typically include a central processing unit and memory to store and process applications. Additionally, each data network telephone 108 and 112 preferably includes a unique device address or network address, such as an IP address, in memory to uniquely identify it to devices in the system 100, and to permit data packets to be routed to the addressed data network telephone. In one embodiment, the data network telephones 108 and 112 each include a handset with a receiver and transmitter similar or identical to handsets of transitional circuit-switched telephones. A console on which the handset sits may include the voice processing system, a display, and a keypad, for example.

In a preferred embodiment, at least a portion of each of the data network telephones 108 and 112 utilizes an NBX 100™ communication system phone offered by 3Com® Corporation. In alternative embodiments, the data network telephones 108 and 112 may include any device having voice communications capabilities. For example, a personal computer having a microphone input and speaker output may also be used to data network telephones 108 and 112. Other configurations are also intended to be within the scope of the present invention.

The details relating to operation of the data network telephones 108 and 112 depend on the nature of the data network 102, the access networks 104 and 106, and/or to other network entities. Additionally, a call management protocol, such as the Session Initiation Protocol (SIP) will preferably be used for call set-up, management, and tear-down functions. SIP is described in M. Handley et al., "SIP: Session Initiation Protocol," IETF RFC 25438, March 1999, incorporated by reference herein. Alternative call management protocols, such as the ITU-T H.323 protocol, Megaco, the Media Gateway Control Protocol (MGCP), and others, may also be used to implement the system 100.

The first connection server 110 and the second connection server 114 provide telephony registration, location, and session initiation services for voice and/or data connections for users of the data network telephones 108 and 112. For example, a user of the first data network telephone 108 may register for telephony service with an administrator of the first connection server 110 and receive a user identifier and a device identifier. The user identifier and device identifier may be sequences of unique alpha/numeric elements that callers use to direct voice connections to the user of a data network telephone. According to the present invention, the identifiers may be one or more communication numbers assigned according to a flexible dial plan. The first and second connection servers 110 and 114 register users by storing user records in registration databases (not shown in FIG. 1), in response to receiving registration requests. The call set-up process and the user and device identifiers preferably conform to requirements defined in a call management protocol, such as SIP. The call management protocol is used to permit a caller on the data network to connect to a user identified by a user identifier in a data network telephony call. A data network telephony call includes at least a call setup process and a voice exchange process. The call setup process includes steps and message exchanges that a caller and callee perform to establish the telephone call. The actual exchange of voice signals is performed by a voice data communications channel. The voice data communications channel incorporates other data transport and data formatting protocols, and preferably includes well-known data communications channels typically established over the Internet.

The first and second connection servers 110 and 114 may also be used to provide telephony service for mobile users. For example, a user may be registered to use the first data network telephone 108 (which is identified by its device identifier), but the user may decide to move to a location near a second data network telephone (not shown) on the first access network 104. The user may re-register as the user of the second data network telephone. The user would then become associated with the second data network telephone. Calls that identify the user by the user's user identifier may then reach the user at the second data network telephone. Alternatively, the user may move to a different access network. Additional details regarding call set-up, call management, call tear-down, and user mobility are described in U.S. patent application Ser. No. 09/451,388, filed Nov. 30, 1999 by Guido M. Schuster, et al., and titled "System and Method for Providing User Mobility Services on a Telephone Network."

C. Data Network Telephones

The data network telephones 108 and 112 are preferably telephones that include an Ethernet communications interface for connection to an Ethernet port. The exemplary data network telephones 108 and 112 support the Internet Protocol (IP), using an IP address that is either statically configured or obtained by access to a Dynamic Host Configuration Protocol (DHCP) server. In a general embodiment, the data network telephone 108 and 112 are data network appliances, offering a flexible set of features and functions that may be customized through resident or downloaded software.

Figure 2:
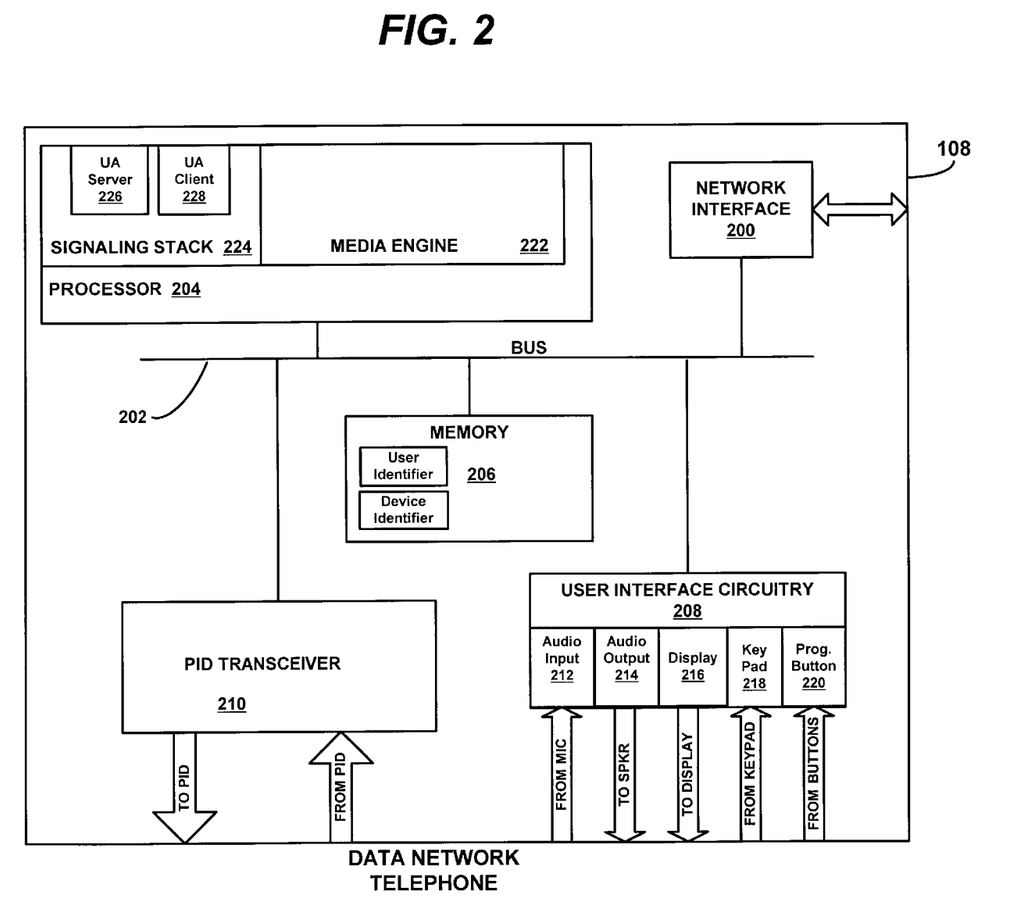
FIG. 2 is a block diagram of a data network telephone according to an exemplary embodiment of the present invention.

FIG. 2 is a block diagram showing the first data network telephone 108, according to an exemplary embodiment of the present invention. The data network telephone 108 is connected to a network, such as the first access network 104, by a network interface 200. The network interface 200 may, for example, be a network interface card, and may be in the form of an integrated circuit. A bus 202 may be used to connect the network interface 200 with a processor 204, a memory 206, and user interface circuitry 208. A PID transceiver 210 may also be included to provide increased user mobility. The PID transceiver 210 may be a proximity transceiver, enabling proximity-based registration. Proximity registration is described in detail in U.S. patent application Ser. No. 09/515,796, filed concurrently herewith, by Guido M. Schuster, et al., and titled "Proximity-Based Registration on a Data Network Telephony System," which is incorporated by reference herein.

The PID transceiver 210 preferably includes hardware and software to enable the data network telephone 108 to communicate with a PID, such as a PDA or portable phone. Several alternatives exist for implementing the PID interface 210. The examples provided here are not meant to limit the scope of the present invention. A first alternative PID transceiver 210 includes an RS-232 serial connection and associated coupling hardware and mechanisms. For example, the PID interface 210 may be a docking cradle or a cradle for a PID, such as a PDA (Personal Digital Assistant), in which information may be transferred between the PID and the data network telephone 108. A second alternative for the PID interface 210 includes infrared circuitry for converting signals into infrared output and for accepting infrared input. A third alternative for the PID interface 210 includes radio frequency circuitry for converting signals into radio frequency output and for accepting radio frequency input. The second and third alternatives provide for wireless communications between the data network telephone 108 and a PID. These three alternatives are merely examples, and additional means for implementing the PID transceiver between the data network telephone 108 and a PID may also be used. Additionally, more than one alternative transceiver may be included within the same data network telephone to provide redundancy in case of failure of an interface, and to improve flexibility. The PID transceiver 210 may be omitted from the data network telephone 108 in some embodiments of the present invention.

The user interface circuitry 208 includes hardware, firmware, and/or software components to provide user input and output resources for the data network telephone 108. For example a handset, display, and keypad may be included in the data network telephone 108, as may other user interface mechanisms. The user interface circuitry may include an audio input interface 212, an audio output interface 214, a display interface 216, a keypad interface 218, and a programmable button interface 220.

For some applications, the user interface circuitry 608 may only need to support sending or receiving, but not both. The user interface circuitry 608 preferably supports the sending and receiving of at least audio information. For example, in the case where the data network telephone 408 is a voice communication device, the user interface circuitry may include a microphone, a speaker, and analog interface circuitry. A videophone implementation might also include a camera and monitor. The data network telephone 108 is not limited to telephones or videophones—additional user interface types, for example, such as the ones needed for computer games, (e.g. a joystick, or virtual reality headset) are also contemplated as being within the scope of the present invention.

The audio input interface 212 may receive voice signals from a microphone or other audio input device and convert the signals to digital information. The conversion preferably conforms to the G.711 ITU-T Standard. Further processing of the digital signal may also be performed, such as compression (e.g. using the ITU-T G.723.1 standard) or noise reduction, although such processing may also be performed in the processor 204. Alternatively, the audio input interface 212 may communicate an analog voice signal to the processor 204 for conversion to digital information.

The audio output interface 214 receives digital information representing voice from the processor 204 and converts the information to sound. In one embodiment, the audio output interface 214 receives information in the form of G.711 although other processing such as decompression may be performed in the audio output interface 214. Alternatively, the processor 204 may convert digital information to analog voice signals and communicate the analog voice signals to the audio output interface 214.

The display interface 216, the keypad interface 218, and programmable button interface 220 include well-known device interfaces and respective signal processing techniques. The display interface 216 may be used to display caller-ID information, menus, contact directories, and other information to the user. The keypad interface 218 enables the user to enter communication numbers, such as phone numbers. If the keypad interface 218 includes alphanumeric keys, then alphanumeric information may be entered by the user. The preferred embodiment of the present invention is intended to utilize only numeric keys (and possibly a limited number of alphanumeric keys), such as those that are found in a standard pushbutton telephone. The programmable button interface 220 may be used for speed-dial keys, for example, to enable the user to program a button to correspond to a contact's telephone number. Alternatively, the programmable button interface 220 may include at least one button that allows the user to switch between PSTN service and data network telephony service.

The processor 204 may consist of one or more smaller processing units, including, for example, a programmable digital signal processing engine. In the preferred embodiment, the processor is implemented as a single ASIC (Application Specific Integrated Circuit) to improve speed and to economize space. The processor 204 also may include an operating system, and application and communications software, firmware, or hardware for implementing various functions of the data network telephone 108. For example, the processor may include a dial plan application to assist a user with placing calls using a dial plan. The dial plan may allow a user to enter a numeric string that corresponds to a SIP URI for a party to be called. Other applications may also be processed by the data network telephone 108. The operating system may be any suitable commercially available embedded or disk-based operating system, or any proprietary operating system.

The processor 204 preferably includes a media engine 222 and a signaling stack 224 to perform the primary communications and application functions of the data network telephone 108. The purpose of the signaling stack in an exemplary data network telephone 108 is to set up, manage, and tear down a call. During the setup phase, the user may enter a user identifier through the keypad interface 218. If a dial plan according to a preferred embodiment of the present invention is used, then the user might enter a numeric string corresponding to a user or device identifier, such as a SIP URI. The signaling stack 224 receives the user entry and formats a request message to send to the user identified by the user identifier to initiate a call. When the request message is sent, the location of the user identified by the user identifier is discovered, communication parameters, such as the supported voice CODEC types are exchanged, and a voice over data channel is established. Personalized Announcement attributes may also be transmitted to the called data network telephone as part of the request message, or as a separate message. During the management phase, other parties may be invited to the call if needed. During the teardown phase, the call is termninated. Call setup, management, and teardown preferably conform to a call-management protocol.

The call-management protocol used in the exemplary data network telephone 108 is the SIP protocol. In particular, the signaling stack 224 implements a User Agent Server 226 and a User Agent Client 228, in accordance with the SIP protocol. Alternative call-management protocols, such as the ITU-T H.323, MEGACO, and MGCP protocols and others, may also be used to implement the present invention.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the connection servers 110 and 114 shown in FIG. 1. Not all server types are required to implement the various embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Universal Resource Indicators (SIP-URIs), which are of the form sip:user@host.domain. Other addressing conventions may also be used.

To be reachable at the data network telephone 108, the user may initiate a registration process, such as by entering information into the data network telephone 108, or by transmit user attributes from a PID to the data network telephone to enable registration. The data network telephone 108 then formats a REGISTER request that includes the user's SIP URI in the "to" field, the data network telephone's SIP URI in the "from" field, and the SIP URI of the registration server (such as the first connection server 110) in the REQUEST-URI field and sends the REGISTER request to the registration server. The registration server registers the user's SIP URI with the IP address of the data network telephone 108 and returns a 200 OK response to the data network telephone 108. Alternative call management protocols will, of course, vary somewhat from the preferred embodiment, which utilizes SIP.

The preferred message sequence described above applies to the case where the SIP URI for the registration server is known. Other approaches to registration are possible, such as broadcasting to the registration multicast address "sip.m-cast.net" (224.0.1.75), and are discussed in further detail in RFC 2543. RFC 2543 refers to a "location server," which may serve as the registration server.

Once the user's SIP URI is registered with the registration server, subsequent calls to the user's SIP URI are resolved to the address of the data network telephone. Thus, if a call is placed to the user's SIP URI, the data network telephone 108 will "ring," alerting the user of an incoming call.

Figure 3:
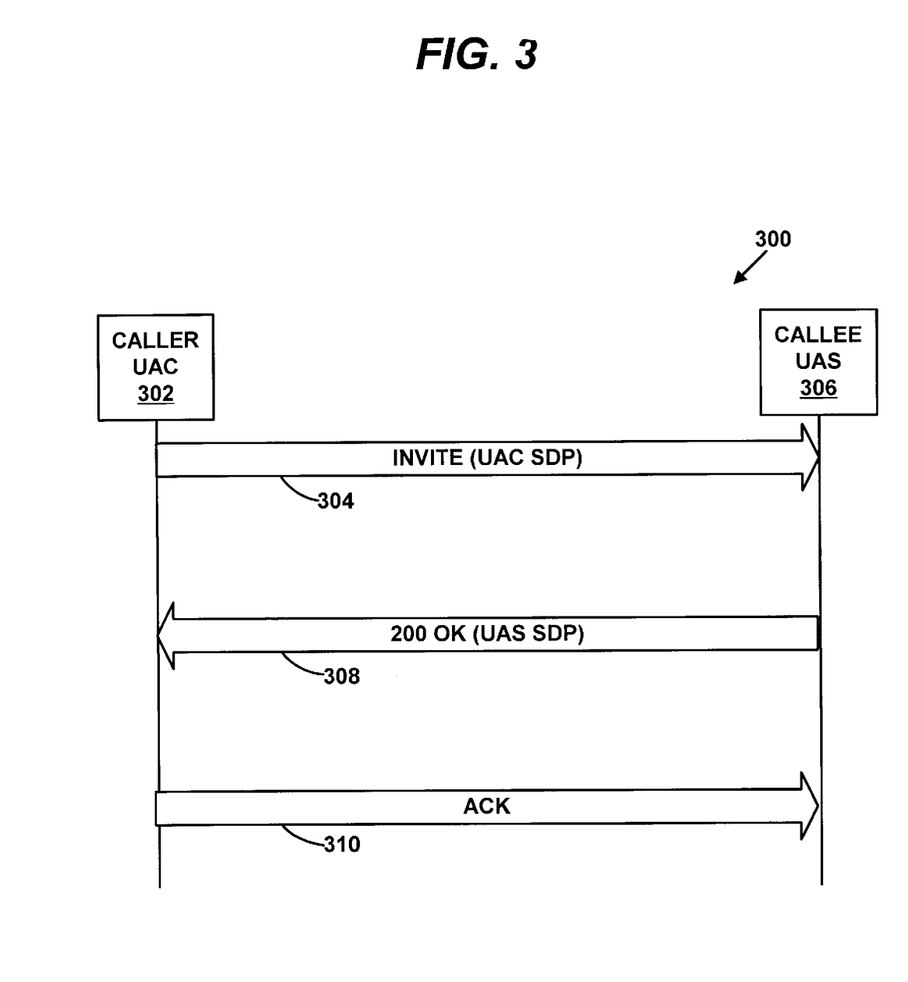
FIG. 3 is a message flow diagram showing an exemplary SIP call setup operation.

FIG. 3 is a message flow diagram showing an exemplary SIP call setup operation 300. A SIP caller UAC 302 sends an INVITE message 304 to a SIP callee UAS 306. (A server, such as a proxy server, is not shown in this illustration). The INVITE message 304 contains session description information (UAC SDP) for the caller UAC 302. The callee UAS 306 sends a 200 OK message 308 to the caller UAC 302. The 200 OK message 308 contains session description information (UAS SDP) for the callee UAS 306. The caller UAC 302 sends an ACK message 310 to the callee UAS 306 to complete the session initiation operation.

Redirect servers may be used to process an INVITE message by sending-back the SIP-URI where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can either be forking or non-forking. A forking proxy can, for example, ring several phones at once until somebody takes the call. Registrar servers are used to record the SIP address (called a SIP URI) and the associated IP address. The most common use of a registrar server is for the UAC to notify the registrar where a particular SIP URI can be reached for a specified amount of time. When an INVITE request arrives for the SIP URI used in a REGISTER message, the proxy or redirect server-forwards the request correctly.

The data network telephones 108 and 112 in the system 100 preferably have pre-programmed device identifiers (e.g. phone numbers), represented as SIP-URI's that are of the form sip: user@domain. An example is sip: 1234567890@3Com.com. After power-up, each of the data network telephones 108 and 112 sends a SIP REGISTER message to the default registrar, such as the connection servers 110 and 114. When a call arrives at one of the connection servers 110 or 114 for any of the registered SIP URIs, the server will forward the call to the appropriate destination. If a data network telephone is moved to a new location, all calls to the associated SIP URI will still be properly routed to that device. In other words, the system 100 provides device mobility in the sense that calls will "follow" the data network telephone according to its SIP URI. This is especially useful if the data network telephone 108 or 112 is running the DHCP (Dynamic Host Configuration Protocol) so that when the location is changed, the IP address is also automatically changed.

An advantage of the system 100 is that once the call is established between data network telephones, the data network 102 provides data connectivity for up to a plurality of data communications channels. For example, the data network telephones 108 and 112 can communicate voice signals as voice-over-data packets on a voice-over-data channel. The data network telephones 118 and 112 may also be able to communicate additional types of data, such as PID data on one or more additional data channels.

Returning to FIG. 2, once the call is set up, the media engine 222 manages the communication over a communication channel using a network transport protocol and the network interface 200. The media engine 222 sends and receives data packets having a data payload for carrying data and an indication of the type of data is being transported. The media engine 222 in the data network telephone 108 may sample the voice signals from the audio input 212 (or receive voice samples from the audio input 212), encode the samples, and build data packets on the sending side. On the receiver side, in addition to performing the reverse operations, the media engine 222 also preferably manages a receiver buffer to compensate for network jitter.

The media engine 222 preferably includes hardware, firmware, and/or software components for performing registration, voice-over-data, display data, keypad output, and dial plan functions. The media engine 222 processes data that is received from a network, such as the first access network 104, and data that is to be sent over the network. The media engine 222 and the signaling stack 224 may operate as a combination, in which the signaling stack is used for operations involving a call management protocol, such as SIP.

For data that is received from a network, the media engine 222 may determine from the type of data in the packet whether packets contain sampled voice signals or data for performing other functions. For example, packet headers or trailers may contain an indication of data type. Packets containing sampled voice signals are processed by a voice over data function. The voice over data function preferably conforms to a protocol for formatting voice signals as digital data streams. While any suitable protocol may be used, the media (voice signal) is preferably transported via the Real Time Protocol RTP), which itself is carried inside of User Datagram Protocol (UDP). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 108 with a registration server, such as the first connection server 110, are processed by a registration function. By registering to the data network telephone 108, a user may establish with a network telephony service provider that calls addressed to the user's user identifier may be connected to the data network telephone 108. Registration may occur when the data network telephone 108 sends a request to register to a service provider host, which may be located at a registration server. The service provider host may respond by setting the user's user identifier to correspond to the device identifier of the data network telephone 108, and by acknowledging the request with a status message to the data network telephone 108. In one embodiment, a request to register the data network telephone 108 to a default user is automatically sent during power-up of the data network telephone 108. As a result, the user becomes associated with the data network telephone 108.

Other features may be added to the registration function or implemented as extensions to the registration function. For example, the data network telephone 108 may be provisioned to provide selected network telephony services by establishing a data connection with a service provider, requesting the selected services, and receiving data that ensures that the services have been successfully provisioned. Such services may include, for example, caller identification, call forwarding, voice mail, and any other service offered by the network telephony service provider to enhance the capabilities of the data network telephone 108. One advantage of such provisioning functions is that services may be ordered for temporary use in a manner that is convenient to the user.

Packets containing data for display on the display device are processed by a display data function. The display data function may be used for displaying, for example, the name(s) and user identifier(s) of other party(-ies) to a call, the status of a call, billing information, and other information For data that is to be sent over the data network 102, the media engine 222 formats the data as data packets in accordance with a selected protocol. The placement of data into packets may also be performed elsewhere in the data network telephone 108. The selected protocol is preferably the protocol that is supported by the data network telephone that will receive the data for the particular type of data being transported. Tunneling may also be used for transport across multiple-protocol environments.

The voice-over-data function formats voice samples, preferably according to the protocol used by the receiving data network telephone. A conversion process may also be undertaken. In one preferred embodiment, the voice over data function formats voice samples as RTP packets.

The second data network telephone 112 is preferably similar or identical to the first data network telephone 108.

Figure 4:
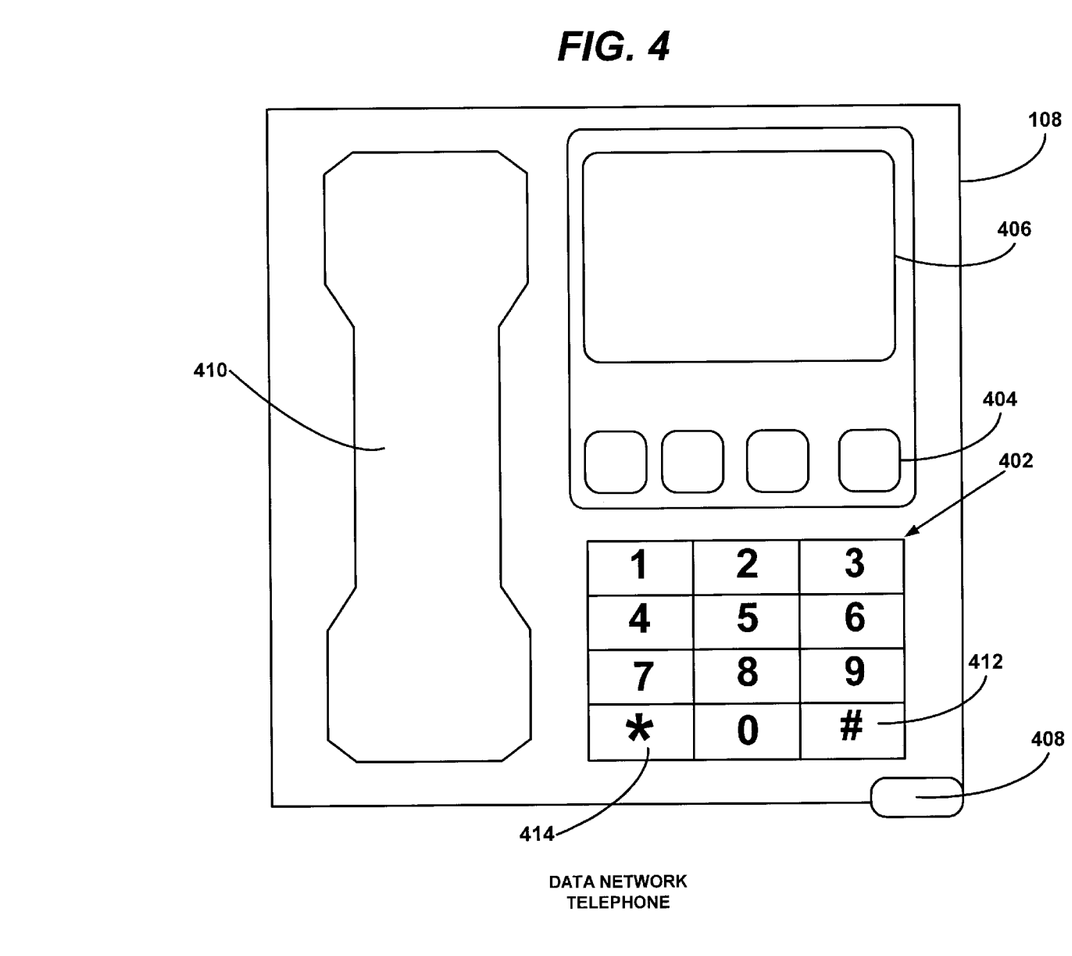
FIG. 4 is a pictorial diagram of a data network telephone according to an exemplary embodiment of the present invention.

FIG. 4 is a pictorial diagram illustrating a data network telephone 108, according to an exemplary embodiment of the present invention. The data network telephone 108 includes a keypad 402, a programmable button 404, a display screen 406, a PID (Portable Information Device) interface 408, and a handset 410.

The keypad 402 allows a user to dial a communication number corresponding to a user or device to be called. The keypad 402 may be similar to other conventional numerical keypads, such as those found on PSTN phones, for example. Included within the keypad 402 may be one or more special purpose keys, such as an "*" key 414 and/or a "#" 412, for example. The "#" key 412 and the "*" key 414 may be used as escape characters to assist with dialing a variable length communications number in accordance with an exemplary embodiment of the present invention.

The programmable button 404 may be one of a plurality of similar buttons, which may be used for functions such as speed dialing, call forwarding, billing, or other functions. The programmable button 404 is preferably used to specify whether an outgoing call is destined for a data network telephone or for a PSTN phone.

The display screen 406 may be an LCD (Liquid Crystal Display) screen, for example. Other display options, may also be used. The display screen 406 may, for example, be used to display the name and number of a caller (caller ID), or a call directory, for example.

The PID interface 408 may be included to support operations involving a PID, such as a PDA (Personal Digital Assistant), and a data network telephone 108. For example, the PID interface 408 may be used to enable user mobility, in which a user transmits user attributes from the PID to the data network telephone 108 to enable the user to be registered to the data network telephone 108. Similarly, the user may use the PID as an interface to place calls on the data network telephone 108. In such a case, the PID would likely contain a call application and a directory of contacts to facilitate easy dialing. For a party to be called, that party's attributes would be transmitted from the PID through the PID interface 408 to the data network telephone 108.

The handset 410 preferably includes a speaker portion and a microphone portion to enable a user to communicate by voice with a second user located at a second data network telephone or at a PSTN telephone, for example.

D. Method for Assigning Communication Numbers to Subscribers and/or Devices on a Data Network Telephony System 1. Variable-Length-Code Communication Numbers The system 100 may be used to implement a dial plan in accordance with the present invention. The data network telephones, such as the data network telephone 108, may include a numerical keypad, such as the keypad 402, but not a full alpha/numeric keyboard, in many instances. Thus, the data network telephone 108 and other similar data network telephones, may utilize a dial plan that assigns numerals to users and/or devices, enabling a user of a data network telephone to dial a number for a user that is located at a particular domain (user@domain.com).

Recently developed call management protocols, such as SIP, are frequently using user and device identifiers that are in a form similar to an e-mail address, i.e., user@domain.com. According to the present invention, these identifiers are mapped onto individually unique communication numbers. For example, a SIP URI of the form johndoe@3com.com may be mapped onto a numerical equivalent of a form specified by the dial plan of the present invention. The system 100 may be expanded to include many domains and/or hosts. Thus, it is unknown how many servers, such as connection servers, will be present. The number of subscribers for each domain is also difficult to determine. Hence, the number of digits in a communication number cannot be fixed, but must be flexible. According to the present invention, flexibility in communication length is achieved by using variable length codes. A communication number would thus have the following format:

NX . . . X where N is a quantity indicator specifying the number of digits in the communication number, not including the quantity indicator. X refers to any digits from the set 0–9, according to one embodiment of the present invention. Other sets, including sets in numbering systems other than base-10, may also be used. Alternatively, the quantity indicator may refer to a different quantity, such as the number of digits in the communication number, including the quantity indicator. Table I shows possible variable length codes that may be used as communication numbers according to an embodiment of the present invention in which only one digit is used as a quantity indicator, and in which all numerals in the base-10 system may be used.

TABLE I

| |
|---|
| 0 |
| 10, 11, 12, 13, 14, 15, 16, 17, 18, 19 |
| 200, 201, . . . , 299 |
| 3000, 3001, . . . , 3999 |
| 40000, 40001, . . . , 49999 |
| . . . |
| 9000000000, 9000000001, . . . , 9999999999 |

To reduce the likelihood of running out of numbers for new domains and users, N may be restricted to one or more digits from a specified subset of the set 0–9. For example, valid numbers for N may include 2, 3, 4, 5, 6, 7, 8, 11, 12, 13, 14, 15, 16, 17, 18, and 19. This exemplary system would allow up to 19 digits to follow N, and allows a user to dial "9" to perform an action, such as to use PSTN service instead of data network telephony service, for example.

As another alternative, an escape character may be used to enable the entry of additional numbers for a particular communication number. For example, "0" could be used as an escape character. Similarly, "*" or "#" may also be used. An example of a dial plan utilizing "0" as an escape code is shown in Table II.

TABLE II

| QUANTITY SPECIFIER | UNIQUE COMM. NUMBERS |
|---|---|
| 1 | 0 . . . ($10^1$-1) |
| . . . | . . . |
| 9 | 0 . . . ($10^9$-1) |
| 01 | 0 . . . ($10^{10}$-1) |
| . . . | . . . |
| 09 | 0 . . . ($10^{18}$-1) |
| 001 | 0 . . . ($10^{19}$-1) |
| . . . | . . . |

As shown in Table II, if a single digit is used as a quantity indicator, then communication numbers ranging from zero digits to nine digits may be used to specify a domain or a user within a domain. If two digits are used as a quantity indicator, then many more communication numbers are available, as shown in Table II. The use of an escape code, such as "0" enables the dial plan to scale upward to accommodate more communication numbers as needed. Additionally, data network telephones may use the same parsing routines regardless of the length of the variable-length-code communication number, according to a preferred embodiment of the present invention. This is due to the consistency in how the communication numbers are coded.

The variable length code scheme described above may be used for coding a user identifier, a device identifier, and/or a domain or host identifier. For example, Tom@company.com could be assigned the communication number (202) 584356, in which case "202" might be the number assigned to the domain "company.com" and "584356" might be the user name assigned to "Tom" within the domain "company.com." Thus, a user could place a call to Tom@company.com using a numerical keypad, such as the keypad 302 shown in FIG. 3.

A flexible dial plan according to the present invention requires no "SEND" button at a data network telephone, such as the data network telephone 108. Unlike many cellular phones, in which a user enters a telephone number and presses a "SEND" button to initiate a call, the dial plan, according to a preferred embodiment of the present invention, only requires that the data network telephone parse the entered communication number into a domain and a user. Thus, the data network telephone determines how many digits are to follow a first quantifying digit or digits, and then reads that many digits from the entered communication number. The data network telephone then determines how many digits are to follow a second quantifying digit or digits and reads that number of digits to determine the user name corresponding to that portion of the entered communication number. This determination is done in real-time, according to a preferred embodiment of the present invention. The parsing process may be implemented as a software, firmware, or hardware routine in which digits are examined on a one-by-one basis in the order in which the numbers were entered to determine the quantity of digits and the user and domain represented by the digits. Known parsing routines may be used to process the dial plans, according to embodiments of the present invention.

2. Data Network/PSTN Modes

According to one embodiment of the present invention, the data network telephone 108 includes a button (either physical or displayed on a screen), such as the programmable button 404, to specify data network mode versus PSTN mode. In embodiments including access to the PSTN, such a mechanism for specifying PSTN mode versus data network mode may be required due to the fact that the PSTN does not currently support variable length coding schemes. The data network mode may, for example, allow the user to place SIP calls using the Internet. Data network calls may be less expensive than PSTN calls. In PSTN mode, a gateway service is typically used, and charges may be applied by a service provider. The user may press the button 404 to alternate between data network mode and PSTN mode. Alternatively, two buttons may be included, such as one for data network mode calls and one for PSTN mode calls.

According to one embodiment of the present invention, a user of a data network telephone may place a call to a second user at a second data network telephone that uses the same provider. For example, the data network telephone 108 may be used to call another data network telephone located on the first access network 104. In this case, the user of the first data network telephone preferably only needs to dial the communication number for the user registered with the other data network telephone on the first access network 104. Thus, if the communication number corresponding to the party to be called is (202) 699-0360, where "202" corresponds to the domain and "699-0360" corresponds to the subscriber (party to be called), then the user at the data network 108 may simply dial {I} 699-0360 to reach the user located at the other data-network telephone on the first access network 104. In this example, "I " refers to an Internet call, which may be initiated by appropriately activating the programmable button 404 on the data network telephone 108. In this case, the user located at the data network telephone 108 also contains a communication number that has a domain portion of "(202)" corresponding to the service provider for the first access network 104. Other configurations of service providers and access networks serviced by the service providers may also be used. Similarly, a service provider may also have more than one domain communication number portion. This exemplary embodiment is similar to the PSTN model of dialing within the same area code.

In another embodiment of the present invention, a subscriber of data network telephony service from a first service provider may call a subscriber of data network telephony service from a second service provider. For example, a first user at the data network telephone 108 may call a second user at the data network telephone 112 via the data network 102 and the first and second access networks 104 and 106. If the first user has a communication number of (200) 634-0610, where the "200" corresponds to the first user's service provider, and the second user has a communication number of (250) 699-0360, where the "250" corresponds to the service provider for the second user, then the provider code "200" or "250" is preferably also dialed as a prefix to the personal number. This is similar to dialing outside a provider area codes in domestic U.S. long distance PSTN calls. Thus, if the first user wishes to place a call to the second user located at the data network telephone 112, then the first user dials {I} 1-250-699-0360, according to a preferred embodiment of the present invention. The use of the "1" may be included to simplify the plan to users having familiarity with the traditional PSTN mode system.

In another embodiment of the present invention, a dial plan is provided to enable a user to call another device (in contrast to calling another user). As was described with reference to FIGS. 2 and 3, SIP and other call management protocols often allow both users and devices to have unique identifiers, such as SIP URIs, for example. Thus, if first user located at the data network telephone 108 wishes to call the data network telephone 112 (and not a particular user), then the first user dials a device ID. If a variable length code is used as a communication number corresponding to the device identifier, then the first user may dial that communication number. For example, if the device identifier for the data network telephone 112 is 1234 1234 1234 12 (the initial "12" may specify that 12 digits are to follow) then the first user may dial {I} 1-0-1234-1234-1234-12. The use of the "0" may be used to indicate that a device identifier is being called. This scheme may also enable the use of more unique communication numbers with the same quantity of digits. Again, the initial "1" may be used to provide familiarity to those having experience with PSTN systems.

The dial plan of the present invention also enables a first user at a data network phone to dial a second user at a PSTN phone, according to an embodiment of the present invention. For example, a first user located at the data network telephone 108 may wish to call a second user located at the PSTN phone 120. If the communication number (phone number) of the PSTN phone 120 is (123 456-7890, then the first user at the data network telephone 108 may dial {P} 1-123-456-7890 to call the PSTN phone 120 in order to reach a user located at the PSTN phone 120. If the second user located at the PSTN phone 120 wishes to call the first user located at the data network telephone 108, the second user may dial an access number along with a second stage extension. First stage dialing (also called direct inward dial) may also be offered as an additional feature. For example, if the first user has a communication number of (202) 634-0610, then the second user at the PSTN phone 120 may dial 1 800-XXX-YYY EXT.1-202-634-0610, where the "XXX-YYYY" is a 1-800 access number. Other access numbers may be used. Similarly, the second user at the PSTN phone 120 may also call the data network telephone 108, instead of the first user located at the data network telephone 108. Here again, the second user may dial an access number followed by a second stage extension corresponding to the device ID of the data network telephone 108.

The dial plans described above are merely exemplary, and modifications may be made thereto without departing from the intended scope of the present invention.

3. Methods for Implementing a Flexible Dial Plan for a Data Network Telephony System The variable-length-code communication scheme and the data network/PSTN mode schemes may be used in various combinations to implement a flexible dial plan for a data network telephony system. A software parsing routine in a data network telephone preferably is used to assist with mapping between an entered communication number and a user identifier, such as a domain portion and a subscriber portion. Upon receiving an entered communication number, a data network telephone may query a database server, such as the first connection server 110 or the second connection server 114. A DNS (Domain Name Server) may alternatively be queried. The database server has access to a database including a listing of unique variable length codes and corresponding user/device identifiers. Additional information may also be included in the database. When the data network telephone determines the user/device identifier corresponding to the entered communication number, the data network telephone may then perform a call set-up operation to place a call to the party to be called.

Figure 5:
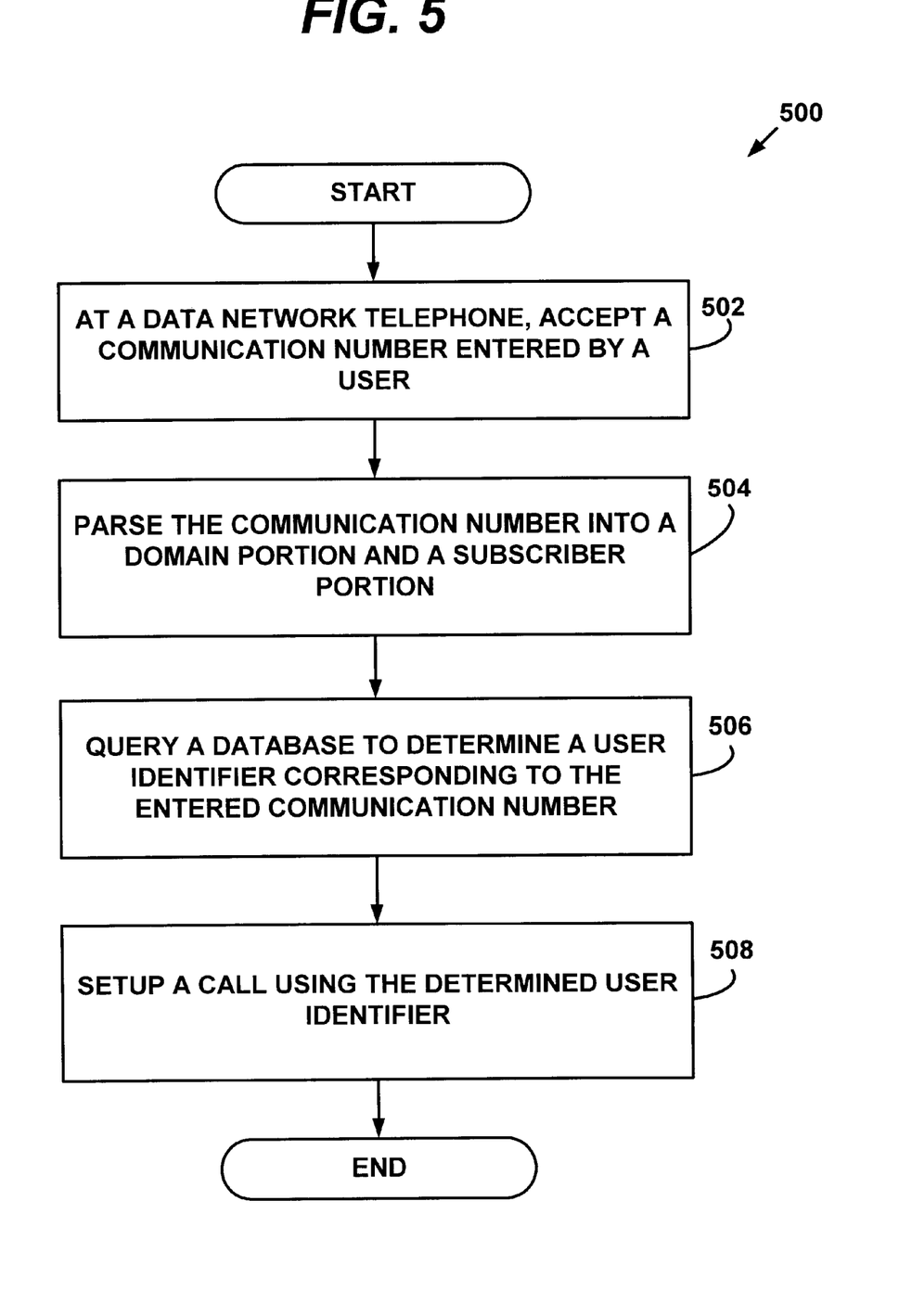
FIG. 5 is a flow diagram illustrating a method for initiating a call on a data network telephony system, according to an embodiment of the present invention.

FIG. 5 is a flow diagram illustrating a method 500 for initiating a call on a data network telephony system, according to an embodiment of the present invention. In step 502, a data network telephone accepts a communication number entered by a user. For example, the user may enter the communication number into a keypad on the data network telephone. In step 504, the data network telephone parses the communication number into a domain portion and a subscriber portion. This parsing may take place as the communication number is being entered by the user. A dial plan may be used to specify what portion of an entered communication number is a quantity specifier, which will enable the data network telephone to determine what portion comprises the remainder of the communication number. In step 506, the data network telephone queries a database to determine a user identifier corresponding to the entered communication number. Alternatively, if the user is attempting to call a device, then the data network telephone may query the database to determine a device identifier corresponding to the entered communication number. An example of a user identifier is a SIP URI. In step 508, the data network telephone sets up a call using the determined user identifier. It should be noted that the communication number preferably includes a domain portion and a subscriber portion, each including a quantity indicator. It may only be necessary to decode (map) the domain portion into a user identifier portion if the domain is able to decode the subscriber portion. For example, if an entered number is 12-3456, the "12" may correspond to a domain of 3Com.com. The 3Com.com domain may be able to decode the "3456" subscriber portion into the appropriate user located on the 3Com.com domain. As an alternative, the data network telephone may also decode the subscriber portion by a database look-up procedure.

Figure 6:
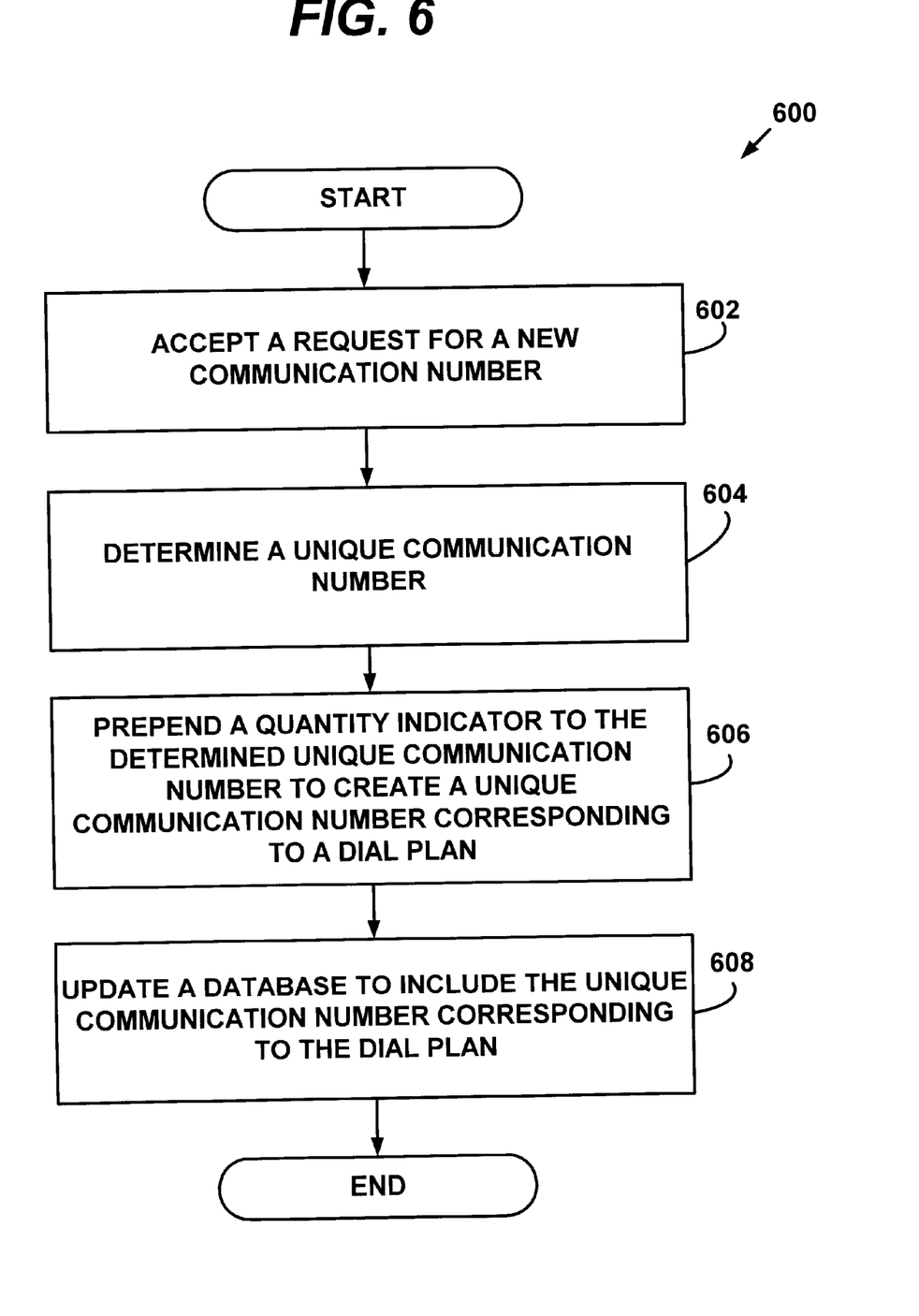
FIG. 6 is a flow diagram illustrating a method for assigning a communication number based on a dial plan, according to an embodiment of the present invention.

FIG. 6 is a flow diagram illustrating a method 600 for assigning a communication number based on a dial plan according to an embodiment of the present invention. In step 602, a request for a new communication number is accepted. In step 604, a unique communication number is determined. In step 606 a quantity indicator is prepended to the determined unique communication number to create a unique communication number corresponding to a dial plan. In step 608, a database is updated to include the unique communication number corresponding to the dial plan. For example, a dial plan administrative entity may assign communication numbers (or domain portions and/or subscriber portions) to service providers or subscribers. The step of determining a unique communication number (step 604) may be based on a first come—first serve ordering scheme, a scheme based on the number of subscribers serviced by a particular service provider, an alphabetical ordering scheme, or a random determination scheme. Other methods may also be used to determine a unique communication number.

While the invention has been described in conjunction with presently preferred embodiments of the invention, persons of skill in the art will appreciate that variations may be made without departure from the scope and spirit of the invention. For example, the access networks shown in FIG. 1 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A method for initiating a call on a data network telephony system, comprising in combination:

accepting at a data network telephone a communication number entered by a user;

parsing the communication number into a quantity indicator, a domain portion, and a subscriber portion, wherein the quantity indicator specifies a quantity of digits following the quantity indicator;

querying a database to determine a user identifier corresponding to the entered communication number, wherein the user identifier includes portions corresponding to the domain portion and the subscriber portion; and formatting a call setup message, wherein the call setup message includes the user identifier.

2. The method of claim 1, wherein a dial plan specifies a quantity indicator format, and wherein parsing the communication number comprises:

reading a domain quantity indicator from the communication number, wherein the domain quantity indicator is determined from the quantity indicator format;

storing as the domain portion a domain quantity of sequential digits following the domain quantity indicator;

reading a subscriber quantity indicator from the communication number, wherein the subscriber quantity indicator is determined from the quantity indicator format; and storing as the subscriber portion a subscriber quantity of sequential digits following the subscriber quantity indicator.

3. The method of claim 2, wherein the database is located with a database server on a data network, wherein the data network telephone is linked to the data network, and wherein the step of querying a database comprises:

transmitting to the database server a database access request including the domain portion;

receiving from the database server a domain identifier, wherein the domain identifier and the subscriber portion compose the user identifier.

4. The method of claim 2, wherein the communication number is a variable-length-code communication number.

5. The method of claim 2, wherein the quantity indicator format specifies that an escape character may be used to specify a larger quantity of digits following a quantity indicator.

6. The method of claim 2, wherein the quantity indicator format specifies that a quantity indicator contains at least one digit and that a subset of numbers are not available for use as a quantity indicator digit.

7. The method of claim 1, wherein the data network telephone operates according to the Session Initiation Protocol standard.

8. The method of claim 1, wherein the data network telephone operates according to the ITU-T H.323 standard.

9. The method of claim 1, wherein the data network telephone operates according to the MEGACO standard.

10. The method of claim 1, wherein the data network telephone operates according to the MGCP standard.

11. A method for assigning a communication number based on a dial plan, comprising:

accepting a request for a new communication number;

determining a unique communication number portion;

prepending a quantity indicator to the determined unique communication number portion to create a unique communication number corresponding to a dial plan, wherein the quantity indicator specifies a quantity of digits following the quantity indicator; and updating a database to include the unique communication number corresponding to the dial plan.

12. The method of claim 11, wherein the request is accepted from a service provider by a dial plan administrator.

13. The method of claim 12, wherein the unique communication number corresponding to the dial plan is a variable-length-code communication number.

14. The method of claim 11, wherein the request is accepted from a subscriber by a service provider.

15. The method of claim 11, wherein the request includes a specification of a domain identifier.

16. The method of claim 11, wherein the request includes a specification of a domain identifier and a user identifier.

17. The method of claim 11, wherein the step of determining a unique communication number portion includes selecting the unique communication number portion to include the least number of digits of all available communication number portions.

18. The method of claim 11, wherein the step of prepending the quantity indicator includes counting the number of digits within the unique communication number portion to determine the value of the quantity indicator.

19. The method of claim 11, wherein the database is remotely located on a data network.

20. The method of claim 11, wherein the database is located with a domain name server.

21. A system for initiating a call on a data network telephony system, comprising in combination:

a data network appliance linked to a data network, wherein the data network appliance is operable to communicate a voice signal as voice-over-data packets on a voice-over-data channel over the data network, wherein the data network appliance is operable to convert voice-over-data packets communicated on the voice-over-data channel to voice signals, and wherein the data network appliance includes a keypad for accepting a communication number from a user; and a database server linked to the data network, wherein the database server includes a database having a listing of communication numbers and an associated listing of identifiers, and wherein the data network appliance identifies a quantity indicator in the communication number, determines a value of the quantity indicator, identifies a portion of the communication number, and queries the database server to determine an identifier corresponding to the portion of the communication number, and wherein the quantity indicator specifies a number of digits following the quantity indicator.

22. The system of claim 21, wherein the identifier is a SIP URI.

23. The system of claim 21, wherein the data network appliance operates according to the Session Initiation Protocol standard.

24. The system of claim 21, wherein the data network appliance is a data network telephone operating according to the ITU-T H.323 standard.

25. The system of claim 21, wherein the data network appliance is a data network telephone operating according to the MEGACO standard.

26. The system of claim 21, wherein the data network appliance is a data network telephone operating according to the MGCP standard.

27. The system of claim 21, wherein the communication number is a variable-length-code communication number.

28. A data network telephone for a data network telephony system comprising in combination:

a keypad for accepting a communication number from a user;

a database server link coupled to a data network, wherein the data network includes a database having a listing of communication numbers and an associated listing of identifiers, and wherein the data network telephone queries the database to determine an identifier corresponding to the communication number; and a dial plan processor for determining a classification of the communication number, wherein determining a classification of the communication number includes classifying a call as a data network telephone call and then parsing the communication number into a quantity indicator, a domain portion, and a subscriber portion.

29. The data network telephone of claim 28 further comprising a programmable button to specify a data network mode and a Public Switched Telephone Network (PSTN) mode.

30. The data network telephone of claim 28 wherein the data network telephone is registered to a service provider, and wherein a call directed to a second data network telephone registered to the service provider is initiated by the data network telephone by dialing the communication number for the second data network telephone.

31. The data network telephone of claim 28 wherein the data network telephone is registered to a service provider, and wherein a call directed to a second data network telephone registered to a second service provider is initiated by the data network telephone by dialing a provider code and the communication number for the second data network telephone, wherein the provider code is prefixed to the communication number.

32. The data network telephone of claim 28 wherein the data network telephone is registered to a service provider, and wherein a call directed to a PSTN telephone is initiated by the data network telephone by dialing an extension number and the communication number for the PSTN telephone, wherein the extension number is prefixed to the communication number.

33. The data network telephone of claim 32 wherein the extension number is a toll free access number.

34. The data network telephone of claim 28 wherein the data network telephone is registered to a service provider, and wherein a call directed to a device registered to the service provider is initiated by the data network telephone by dialing a device identifier and the communication number for the device, wherein the device identifier is prefixed to the communication number.

35. The data network telephone of claim 28 wherein the data network telephone is registered to a service provider, and wherein a call directed to a second data network telephone is initiated by the data network telephone by dialing the communication number for the second data network telephone.

36. The data network telephone of claim 35 wherein the dial plan processor accepts the communication number for the second data network telephone and detects a data network telephone call, and wherein the database server link coupled to the data network queries the database to determine a registration of the second data network telephone corresponding to the communication number of the second data network telephone.

37. The data network telephone of claim 28 wherein the subscriber portion of the communication number determines a user identifier and a device identifier of a called device on the data network telephony system.

38. The data network telephone of claim 28 wherein the database server link queries the database to determine a registration of a called device corresponding to the subscriber portion of the communication number.

39. The data network telephone of claim 28 wherein the database server link queries the database to determine a registration of a called device corresponding to the domain portion of the communication number.

40. The data network telephone of claim 28 wherein the quantity indicator specifies a number of digits following the quantity indicator.

* * * * *